(12) United States Patent
Grawrock

(10) Patent No.: US 7,480,806 B2
(45) Date of Patent: Jan. 20, 2009

(54) MULTI-TOKEN SEAL AND UNSEAL

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1301 days.

(21) Appl. No.: 10/082,600

(22) Filed: Feb. 22, 2002

(65) Prior Publication Data

US 2003/0163711 A1  Aug. 28, 2003

(51) Int. Cl.
*G06F 11/30* (2006.01)
*G06F 12/14* (2006.01)
*H04L 9/32* (2006.01)
*H04L 9/00* (2006.01)
*H04K 1/00* (2006.01)
*G06F 7/04* (2006.01)
*G06F 17/30* (2006.01)
*H03M 1/68* (2006.01)
*G06K 9/00* (2006.01)

(52) U.S. Cl. .................. 713/189; 713/164; 713/185; 380/277; 726/26

(58) Field of Classification Search .................. None
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,759,064 A | 7/1988 | Chaum | |

(Continued)

FOREIGN PATENT DOCUMENTS

DE  4217444  12/1992

(Continued)

OTHER PUBLICATIONS

Brands, Stefan, "Restrictive Blinding of Secret-Key Certificates", *Springer-Verlag* XP002201306, (1995),Chapter 3.

(Continued)

*Primary Examiner*—Ayaz R Sheikh
*Assistant Examiner*—Arezoo Sherkat
(74) *Attorney, Agent, or Firm*—Thomas R. Iane

(57) ABSTRACT

Methods, apparatus and computer readable medium are described for sealing objects to two or more tokens. Further, methods, apparatus and computer readable medium are described for unsealing objects that have been sealed to two or more tokens.

43 Claims, 9 Drawing Sheets

U.S. PATENT DOCUMENTS

| | | | |
|---|---|---|---|
| 4,795,893 A | 1/1989 | Ugon | |
| 4,799,258 A * | 1/1989 | Davies | 713/159 |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,008,935 A * | 4/1991 | Roberts | 380/29 |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,768,390 A * | 6/1998 | Coppersmith et al. | 380/42 |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,012,144 A * | 1/2000 | Pickett | 726/26 |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | |
| 6,252,650 B1 | 6/2001 | Nakaumra | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |

| | | | |
|---|---|---|---|
| 6,363,486 B1 * | 3/2002 | Knapton, III | 726/7 |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,986,042 B2 * | 1/2006 | Griffin | 713/164 |
| 7,069,439 B1 * | 6/2006 | Chen et al. | 713/172 |
| 7,117,376 B2 * | 10/2006 | Grawrock | 380/277 |
| 7,318,235 B2 * | 1/2008 | Grawrock | 726/26 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0073316 A1 * | 6/2002 | Collins et al. | 713/174 |
| 2002/0147916 A1 | 10/2002 | Strongin et al. | |
| 2002/0152392 A1 * | 10/2002 | Hardy et al. | 713/189 |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |
| 2005/0141717 A1 * | 6/2005 | Cromer et al. | 380/277 |
| 2005/0235148 A1 * | 10/2005 | Scheidt et al. | 713/168 |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1085396 | 3/2001 |
| EP | 1146715 | 10/2001 |
| EP | 1271277 | 1/2003 |
| JP | 02000076139 A | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01/75565 | 10/2001 |
| WO | WO 01/75595 | 10/2001 |
| WO | WO 0175564 A | 10/2001 |
| WO | WO0201794 | 1/2002 |
| WO | WO 0217555 A | 2/2002 |
| WO | WO02060121 | 8/2002 |
| WO | WO 02086684 A | 10/2002 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC, USA XP002201307*, (1997),475.

Richt, Stefan, et al., "In-Circuit-Emulator Wird Echtzeittauglich", *Elektronic*, Franzis Verlag GMBH, Munchen, DE, vol. 40, No. 16, XP000259620,(100-103),Aug. 6, 1991.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering*, University of California, San Diego, La Jolla, CA, (Nov. 2001).

Heinrich, J., "MIPS R4000 Microprocessor User's Manual,"Apr. 1, 1993, MIPS, Mt. View, XP002184449, pp. 61-97.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How Do I Create A Signed Applet?," Dr. Dobb's Journal, M&T Publ., Redwood City, CA, US, Vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Coulouris, George, et al., "Distributed Systems, Concepts and Designs", *2nd Edition*, (1994),422-424.

Crawford, John , "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", Fabry, R.S., "*Capability-Based Addressing," Communications of the ACM*, vol. 17, No. 7, (Jul. 1974),403-412.

Frieder, Gideon , "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2001),1-112.

Intel Corporation, "Intel 82802AB/82802AC Firmware Hub (FWH)", *Intel Product Datasheet,* Document No. 290658-004,(Nov. 2000), 1-6, 17-28.

Intel Corporation, "Intel 1A-64 Architecture Software Developer's Manual", *vol. 2: 1A-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237, (Oct. 1996), 403-405, 506-515, 570.

Nanba, S., et al., "VM/4: ACOS-4 Virtual Machine Architecture", *VM/4: ACOS-4 Virtual Machine Architecture, IEEE,* (1985), 171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473; 518-522.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

* cited by examiner

MULTI-TOKEN SEAL AND UNSEAL

BACKGROUND

Existing software-based security services make the implicit assumption that a computing device or platform is trusted. They provide application-level security on the assumption that they execute in a safe environment. This assumption is true enough to justify the level of security required for existing business models, but state-of-the-art security functions are already providing the highest levels of protection that are possible without additional hardware support.

To this end, the Trusted Platform Computing Alliance (TPCA) describe in the TCPA Main Specification, Version 1.1a, Dec. 1, 2001 a Trusted Platform Module (TPM) or physical token that provides increased confidence and that enables enhancements of existing services and new services. The TPM supports auditing and logging of software processes, platform boot integrity, file integrity, and software licensing. The TPM provides a protected store where items can be protected from exposure or improper use and provides an identity that can be used for attestation. These features encourage third parties to grant the platform access to information that would otherwise be denied.

The TPM contains an isolated computing engine whose processes can be trusted because they cannot be altered. These processes and the binding of the TPM to the platform can combine to reliably measure and report the state of the main computing environment inside the platform. The TPM provides a root of trust for the booting of the platform. While it is the Owner's responsibility to provide a safe operating system for a platform, once the OS has loaded, it can report the loading of untrusted software to the TPM before that untrusted software is loaded. The TPM can therefore report measured data that indicates the current state of the main software environment in the platform. A local or remote entity can simply query the TPM to reliably obtain these measurements and decide whether the platform's behavior enables it to be trusted for the intended purpose. Confidence in the loading of software is improved, because the TPM can attest to the current state of the operating system.

The TPM may act as a portal to confidential data, and may allow the release or use of that data only in the presence of a particular combination of access rights and software environment. Of course, the protected store of the TPM may be used for any sensitive data, not just identity information. The TPM may export these services to system-level software security services (such as IPSec) that are themselves called as services by ordinary applications. This arrangement enables greater confidence in the identity of a platform, while simultaneously allowing platform anonymity if so desired. Hence, any application that invokes proof of identity can be used with greater confidence and be allowed greater power.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
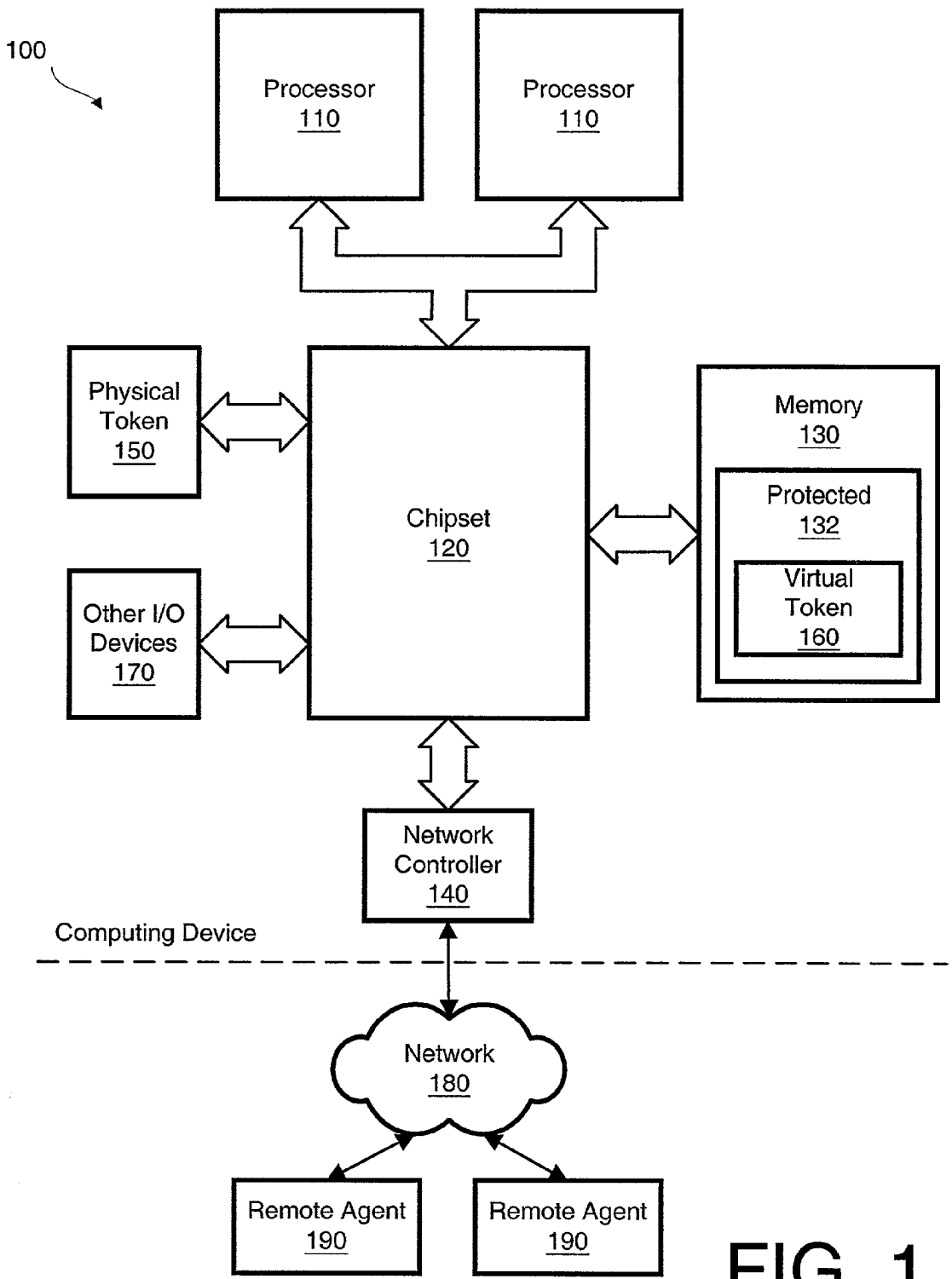
FIG. 1 illustrates an example computing device comprising a physical token and a virtual token.

An example computing device 100 shown in FIG. 1 may comprise one or more processors 110. The processors 110 may support one or more operating modes such as, for example, a real mode, a protected mode, a virtual 8086 mode, and a virtual machine mode (VMX mode). Further, the processors 110 may support one or more privilege levels or rings in each of the supported operating modes. In general, the operating modes and privilege levels of a processor 110 define the instructions available for execution and the effect of executing such instructions. More specifically, a processor 110 may be permitted to execute certain privileged instructions only if the processor 110 is in an appropriate mode and/or privilege level.

The chipset 120 may comprise one or more integrated circuit packages or chips that couple the processors 110 to memory 130, a network interface 140, a physical token 150, a virtual token 160, and other I/O devices 170 of the computing device 100 such as, for example, a mouse, keyboard, disk drive, video controller, etc. The chipset 120 may comprise a memory controller (not shown) for writing and reading data to and from the memory 130. Further, the chipset 120 and/or processors 110 may define certain regions of the memory 130 as protected memory 132 that may be accessed only by the processors 110 when in a particular operating mode (e.g. protected mode) and privilege level (e.g. OP).

The network interface 140 generally provides a communication mechanism for the computing device 100 to communicate with one or more remote agents 190 (e.g. certification authorities, retailers, financial institutions) via a network 180. For example, the network interface 140 may comprise a 10 Mb or 100 Mb Ethernet controller, a cable modem, a digital subscriber line (DSL) modem, plain old telephone service (POTS) modem, etc. to couple the computing device 100 to the one or more remote agents 190.

In general, the physical token 150 of the computing device 100 comprises protected storage for metrics, keys and secrets and may perform various integrity functions in response to requests from the processors 110 and the chipset 120. In particular, the physical token 160 may store metrics in a trusted manner, may quote metrics in a trusted manner, may seal secrets to a particular environment (current or future), and may unseal secrets to the environment to which they were sealed.

The virtual token 160 performs in a manner similar to the physical token 150 of the computing device 100. However, the virtual token 160 may comprise more protected storage for metrics, keys and secrets since the virtual token 160 may leverage the storage capacity of the memory 130 and the protect memory 132 to store metrics, keys and secrets. Further, the virtual token 160 may perform integrity operations quicker than the physical token 150 since the virtual token 160 may leverage the processing capabilities of the processors 110 to perform such integrity operations.

Figure 2:
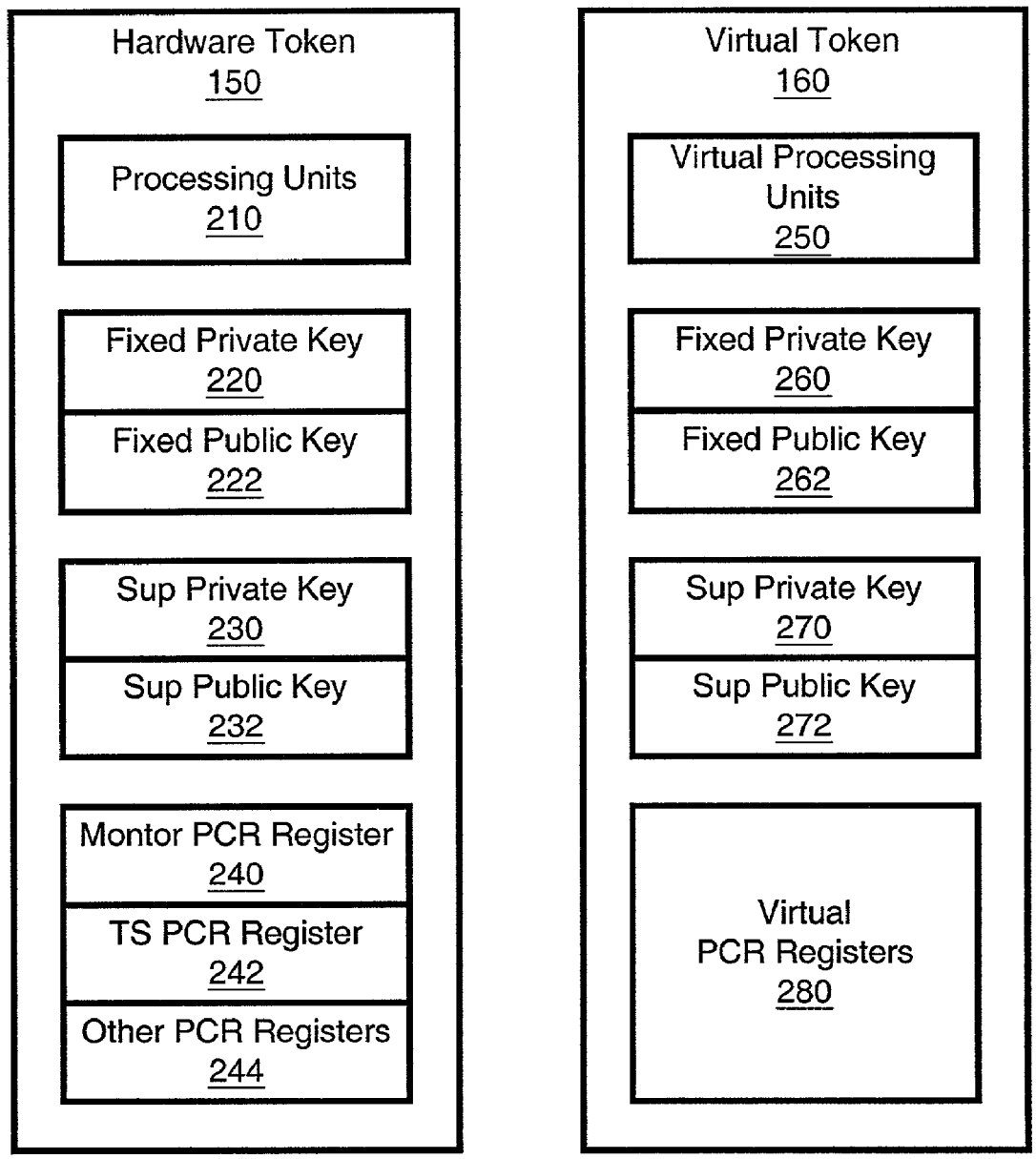
FIG. 2 illustrates an example physical token and an example virtual token of FIG. 1.

As illustrated in FIG. 2, the physical token 150 may comprise one or more processing units 210 that may perform integrity functions for the computing device 100. The physical token 150 may further generate a fixed private key 220 and a corresponding fixed public key 222 in accordance with an asymmetric cryptographic algorithm such as, for example, the RSA cryptographic algorithm. In an example embodiment, the physical token 150 generates the fixed private/public key pair 220, 222 such that the fixed private key 220 and corresponding public key 222 are unique and immutable once activated.

The physical token 150 may also be affixed to or incorporated into the computing device 100 to provide some assurance to remote agents 190 that the physical token 150 is associated with only one computing device 100. For example, the physical token 150 may be incorporated into one of the chips of the chipset 120 and/or surface mounted to the main board of the computing device 100. Due to the uniqueness of the fixed physical token 150 and its incorporation into the computing device 100, a remote agent 190 may identify a computing device 100 with some certainty based upon the fixed public key 222 of the physical token 150.

Besides the fixed private/public key pair 220, 222, the physical token 150 may further generate one or more supplemental private/public key pairs 230, 232 in accordance with an asymmetric cryptographic algorithm. In an example embodiment, the computing device 100 may generate supplemental private/public key pairs 230, 232 as needed whereas the fixed private/public key pair 220, 222 is immutable. Accordingly, the computing device 100 typically provides the fixed public key 222 to only a small trusted group of entities such as, for example, a certification authority. Further, the computing device 100 typically utilizes its supplemental private/public key pairs 230, 232 for most other encryption, decryption, and digital signing operations to reduce exposure of the fixed public key 222.

The physical token 150 may further comprise one or more platform configuration registers (PCR registers) 240, 242, 244 that may be used to record and report metrics in a trusted manner. The processing units 210 may support a PCR quote operation that returns a quote or contents of an identified PCR register 240, 242, 244. The processing units 210 may also support a PCR extend operation that records a received metric in an identified PCR register 240, 242, 244. In particular, the PCR extend operation may (i) concatenate or append the received metric to an metric stored in the identified PCR register 240, 242, 244 to obtain an appended metric, (ii) hash the appended metric to obtain an updated metric that is representative of the received metric and previously metrics recorded by the identified PCR register 240, 242, 244, and (iii) store the updated metric in the PCR register 240, 242, 244.

The processing units 210 of the physical token 150 may further support a seal operation and an unseal operation. In response to a seal operation, the physical token 150 generates a sealed object comprising an object sealed to the physical token 150 and a specified device environment. Conversely, the physical token 150 may return an object of a sealed object in response to an unseal operation only if the object was sealed with a key of the physical token 150 and the current device environment satisfies environment criteria specified for the sealed object.

As used herein, the term "object" is intended to be a broad term encompassing any grouping of one or more bits regardless of structure, format, or representation. Further, the verb "hash" and related forms are used herein to refer to performing an operation upon an operand or message to produce a value or a "hash". Ideally, the hash operation generates a hash from which it is computationally infeasible to find a message with that hash and from which one cannot determine any usable information about a message with that hash. Further, the hash operation ideally generates the hash such that determining two messages which produce the same hash is computationally impossible. While the hash operation ideally has the above properties, in practice one way functions such as, for example, the Message Digest 5 function (MD5) and the Secure Hashing Algorithm 1 (SHA-1) generate hash values from which deducing the message are difficult, computationally intensive, and/or practically infeasible.

The physical token 150 may be implemented in a number of different manners. For example, the physical token 150 may be implemented to comply with the specification of the Trusted Platform Module (TPM) described in detail in the Trusted Computing Platform Alliance (TCPA) Main Specification, Version 1.1, Jul. 31, 2001.

Still referring to FIG. 2, the virtual token 160 may provide virtual or software constructs that provide functionality similar to the physical token 150. In particular, the virtual token 160 may comprise one or more virtual processing units 250 that may perform integrity functions for the computing device 100. The virtual token 160 may further generate a fixed private key 260 and a corresponding fixed public key 262 in accordance with an asymmetric cryptographic algorithm such that the fixed private key 260 and corresponding public key 262 are unique and immutable once activated.

Besides the fixed private/public key pair 260, 262, the virtual token 160 may also generate one or more supplemental private/public key pairs 270, 272 in accordance with an asymmetric cryptographic algorithm. The virtual token 160 may further comprise one or more virtual PCR registers 280 that may be used to record and report metrics in a trusted manner.

Figure 3:
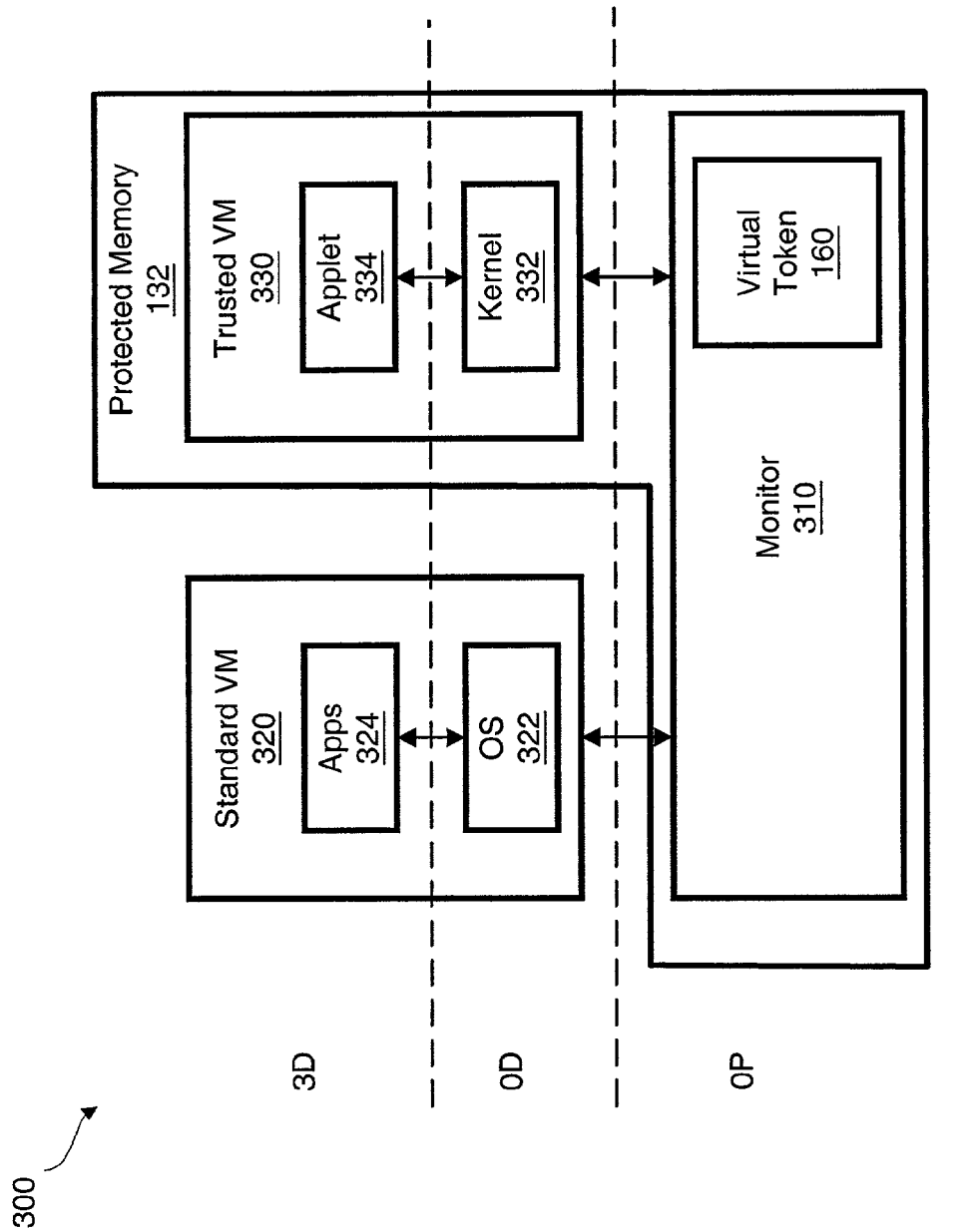
FIG. 3 illustrates an example trusted operating environment that may be implemented by the computing device of FIG. 1.

An example trusted operating environment 300 is shown in FIG. 3. The computing device 100 may utilize the operating modes and the privilege levels of the processors 110 to establish the trusted operating environment 300. As shown, the trusted operating environment 300 may comprise a trusted virtual machine kernel or monitor 310, one or more standard virtual machines (standard VMs) 320, and one or more trusted virtual machines (trusted VMs) 330. The monitor 310 of the operating environment 300 executes in the protected mode at the most privileged processor ring (e.g. OP) to manage security and privilege barriers between the virtual machines 320, 330. Further, the monitor 310 may comprise code that implements the functionality of the virtual token 160. Alternatively, the virtual token 160 may be implemented with a separate VT software module.

The standard VM 320 may comprise an operating system 322 that executes at the most privileged processor ring of the VMX mode (e.g. 0D), and one or more applications 324 that execute at a lower privileged processor ring of the VMX mode (e.g. 3D). Since the processor ring in which the monitor 310 executes is more privileged than the processor ring in which the operating system 322 executes, the operating system 322 does not have unfettered control of the computing device 100 but instead is subject to the control and restraints of the monitor 310. In particular, the monitor 310 may prevent the operating system 322 and its applications 324 from accessing protected memory 132 and the physical token 150.

The monitor 310 may perform one or more measurements of the trusted kernel 332 such as a hash of the kernel code to obtain one or more metrics, may cause the physical token 150 to extend an identified PCR register 244 with the metrics of the kernel 332, and may record the metrics in an associated PCR log stored in protected memory 132. Further, the monitor 310 may establish the trusted VM 330 in protected memory 132 and launch the trusted kernel 332 in the established trusted VM 330.

Similarly, the trusted kernel 332 may take one or more measurements of an applet or application 334 such as a hash of the applet code to obtain one or more metrics. The trusted kernel 332 via the monitor 310 may then cause the physical token 150 to extend an identified PCR register 244 with the metrics of the applet 334. The trusted kernel 332 may further record the metrics in an associated PCR log stored in protected memory 132. Further, the trusted kernel 332 may launch the trusted applet 334 in the established trusted VM 330 of the protected memory 132.

In response to initiating the trusted operating environment 300 of FIG. 3, the computing device 100 also records metrics for the monitor 310 and the virtual token 160 in the monitor PCR register 240 and also records metrics for the hardware in the trusted support (TS) PCR register 242. The trusted operating environment 300 may be initiated in response to various events such as, for example, system startup, an application request, an operating system request, etc.

In an example embodiment, the computing device 100 obtains and records metrics for the monitor 310 and the virtual token 160 as follows. The processor 110 hashes a monitor software module to obtain a monitor metric. The processor 110 then causes the physical token 150 to extend the monitor PCR register 240 with the monitor metric, and records the monitor metric in a monitor PCR log stored in protected memory 132. Further, if the virtual token (VT) functionality is implemented as a separate software module, the processor 110 hashes the VT software module to obtain a VT metric. The processor 110 then causes the physical token 150 to further extend the monitor PCR register 240 with the VT metric and records the VT metric in the monitor PCR log. The monitor PCR register 240 now comprises a value that is representative of both the monitor 310 and the virtual token 160.

The computing device 100 may further record metrics for the hardware in TS PCR register 242 to provide a record of the hardware support for trusted operating environments. In an example embodiment, the processor 110 may obtain hardware identifiers such as, for example, processor family, processor version, processor microcode version, chipset version, and physical token version of the processors 110, chipset 120, and physical token 150. The processor 110 may then extend the TS PCR register 242 with obtained hardware identifiers and record the hardware identifiers in a TS PCR log stored in protected memory 132. Alternatively, the processor 110 may use more than one PCR register to record the hardware identifiers. For example, the processor 110 may store each obtained hardware identifier into a separate PCR register 240, 242, 244.

Figure 4:
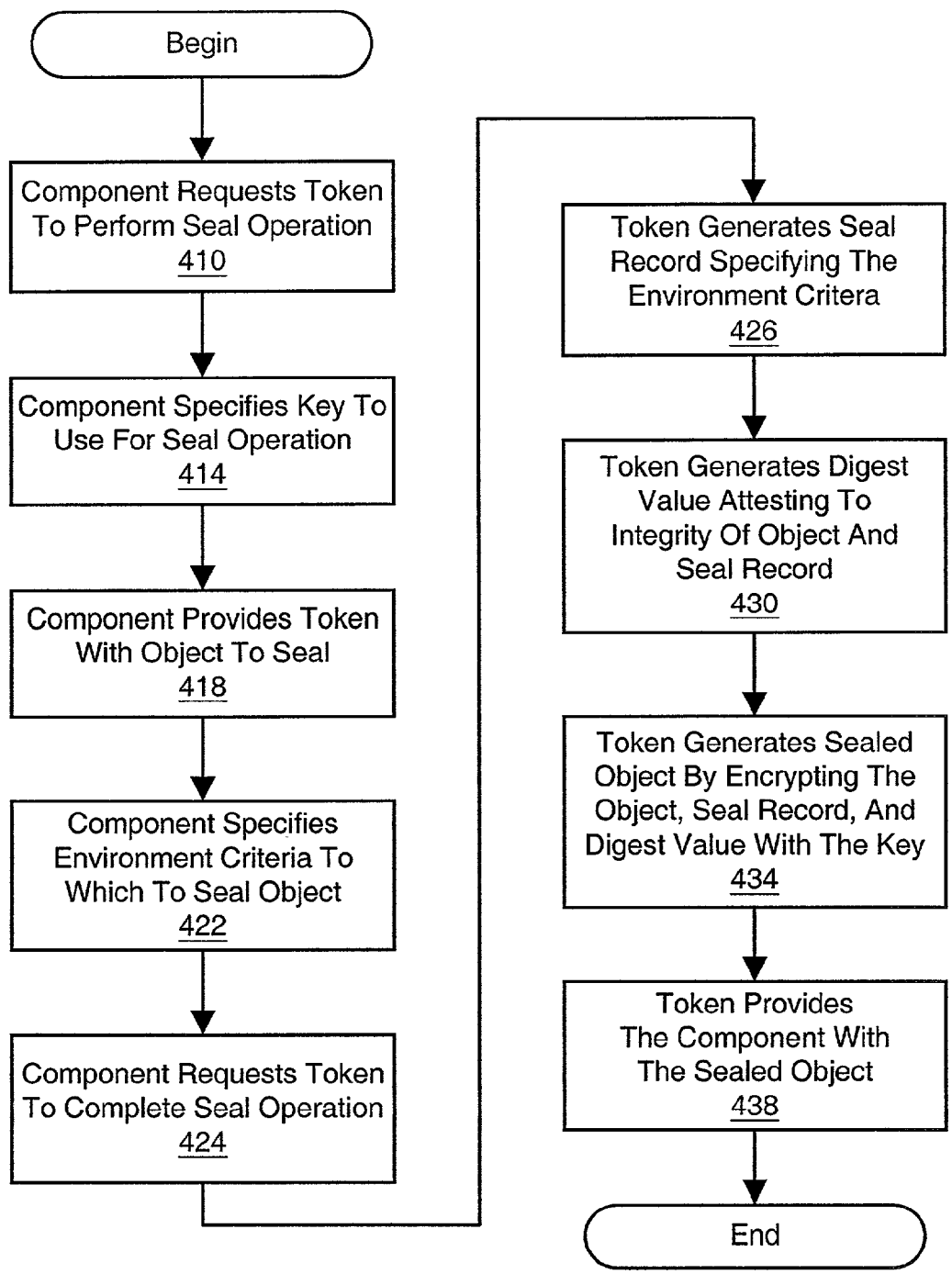
FIG. 4 illustrates an example seal operation of the computing device of FIG. 1.

Referring now to FIG. 4, an example seal operation is illustrated. The seal operation in general results in a sealing component such as, for example, the monitor 310, the kernel 332, trusted applets 334, operating system 322, application 324, the physical token 150, and/or the virtual token 160 generating a sealed object SObj that is sealed to a token (e.g. physical token 150 or virtual token 160).

In block 410, the sealing component requests a token (e.g. the physical token 150 or the virtual token 160) to perform a seal operation. The sealing component in block 414 specifies a public token key SK (e.g. public keys 222, 232, 262, 272) to use for the seal operation. The sealing component provides the token with an object Obj to seal (block 418), and specifies environment criteria to which the object Obj is to be sealed (block 422). For example, the sealing component in block 422 may specify the environment criteria by identifying one or more PCR registers (e.g. PCR registers 240, 242, 244, 280) of the token that have metrics for one or more aspects of the current device environment. After providing the token with the above information, the sealing component in block 424 requests that the token complete the seal operation.

In response to the request to complete the seal operation, the token in block 426 generates a seal record SealRec that specifies the environment criteria (e.g. quotes of PCR registers 240, 242, 244, 280) to which the object Obj is sealed. In an example embodiment, the token generates the seal record SealRec such that it includes a unique identifier that is built-in the token. In block 430, the token hashes the object Obj and the seal record SealRec to obtain a digest value DV that attests to the integrity of the object Obj and the seal record SealRec. The token in block 434 generates a sealed object SObj by encrypting the object Obj, the seal record SealRec, and the digest value DV using an asymmetric cryptographic algorithm and the public token key SK. In block 438, the token provides the sealing component with the sealed object SObj that comprises the object Obj, the seal record SealRec, and the digest value DV encrypted with the public token key SK.

Figure 5:
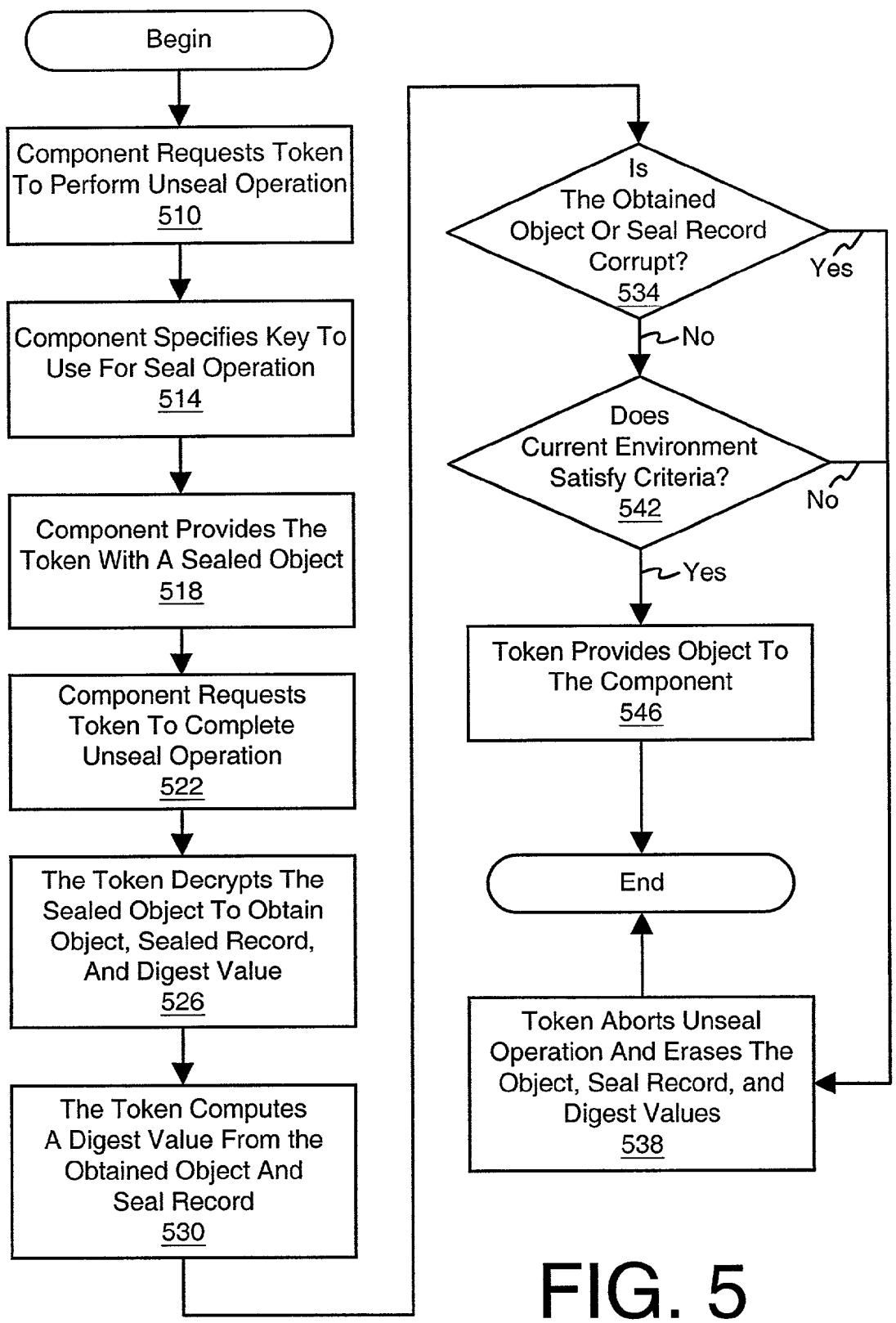
FIG. 5 illustrates an example unseal operation of the computing device of FIG. 1.

Referring now to FIG. 5, an example unseal operation is illustrated. The unseal operation in general results in an unsealing component such as, for example, the monitor 310, the kernel 332, trusted applets 334, operating system 322, application 324, the physical token 150, and/or the virtual token 160 retrieving an object Obj that has been sealed to a token (e.g. physical token 150 or virtual token 160).

In block 510, the unsealing component requests a token (e.g. the physical token 150 or the virtual token 160) to perform an unseal operation. The unsealing component in block 514 specifies a private token key UK (e.g. private keys 220, 230, 260, 270) to use for the unseal operation. The unsealing component provides the token with a sealed object SObj to be unsealed in block 518. In block 522, the unsealing component requests the token to complete the unseal operation.

The token in block 526 decrypts the sealed object SObj using the private token key UK specified by the unsealing component in block 514. If the private token key UK corresponds to the private token key SK used to seal the sealed object SObj, the token in block 526 obtains the object Obj, the seal record SealRec, and the digest value DV. Otherwise, the token encounters an error condition and/or obtains corrupted representations of the object Obj, the seal record SealRec, and the digest value DV.

In block 530, the token hashes the obtained object Obj and seal record SealRec to obtain a computed digest value CDV. In block 534, the token determines whether the obtained object Obj and seal record SealRec have been corrupted. For example, the token may determine that the object Obj, seal record SealRec, and/or digest value DV has been corrupted in response to the computed digest value CDV and the digest value DV having a predetermined relationship (e.g. not equal).

In response to determining that the object Obj, seal record SealRec, and/or digest value DV is corrupted, the token in block 538 aborts the unseal operation and erases the object Obj, the seal record SealRec, the digest value DV, and the computed digest value CDV from the token. Otherwise, the token in block 542 determines whether the current device environment satisfies the environment criteria specified for the sealed object SObj. For example, the token may determine that the current device environment satisfies the environment criteria if quotes of its PCR registers (e.g. PCR registers 240, 242, 244, 280) specified by the seal record SealRec have a predetermined relationship (e.g. equal) with the quotes of the seal record SealRec and if the unique identifier obtained from the seal record SealRec has a predetermined relation (e.g. equal) with the unique identifier built-in the token.

In response to determining that the current device environment does not satisfy the environment criteria, the token in block 538 aborts the unseal operation and erases the object Obj, the seal record SealRec, the digest value DV, and the computed digest value CDV from the token. Otherwise, the token provides the object Obj to the unsealing component in block 546.

The above example seal and unseal operations use a public key SK to seal an object Obj and a private key UK to unseal an object Obj via an asymmetric cryptographic algorithm. However, the token may alternative use a single key SUK to both seal an object Obj and unseal an object Obj using a symmetric cryptographic algorithm. For example, the token may comprise an embedded key SUK that is used to seal and unseal objects via a symmetric cryptographic algorithm (e.g. DES, 3DES, AES, etc.).

Figure 6:
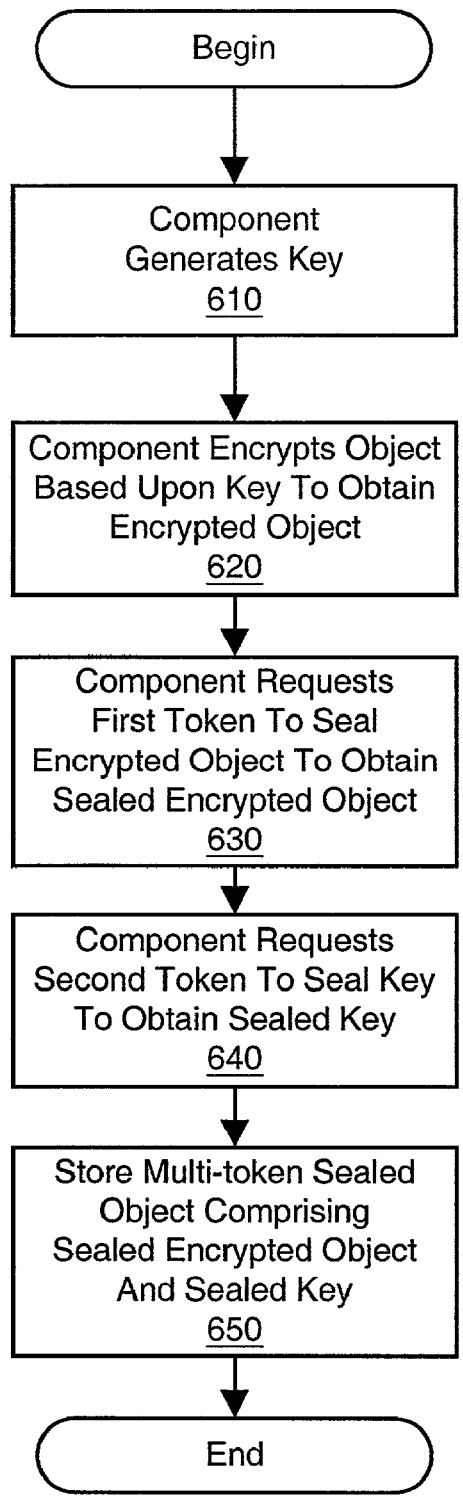
FIG. 6 illustrates an example multi-token seal operation of the computing device of FIG. 1.

An example multi-token seal operation is illustrated in FIG. 6. The multi-token seal operation in general results in a sealing component such as, for example, the monitor 310, the kernel 332, trusted applets 334, operating system 322, application 324, the physical token 150, and/or the virtual token 160 generating a multi-token sealed object MSObj that is sealed to two or more tokens (e.g. physical token 150 and virtual token 160). The following example multi-token seal operation is described in the context of a component sealing an object Obj to the physical token 150 and the virtual token 160 of the example computing device 100. However, it should be appreciated that the sealing component may alternatively seal the object Obj to more than two tokens and that the sealing component may seal the object Obj to different combinations of tokens (e.g. two physical tokens).

In block 610, a sealing component generates a key K using a random number generator such that key K comprises random uniqueness. It should be appreciated that the random number generator may generate pseudo-random numbers thus resulting in the key K comprising pseudo-random uniqueness. Hereinafter, the general term "random" is used to denote both truly-random and pseudo-random properties. The sealing component in block 620 encrypts the object Obj using the key K and a symmetric cryptographic algorithm to obtain an encrypted object EObj.

To obtain a sealed encrypted object SEObj, the sealing component in block 630 requests the virtual token 160 to seal the encrypted object EObj to specified environment criteria using a specified key SK of the virtual token 160. For example, the sealing component may specify the environment criteria by identifying one or more PCR registers 280 of the virtual token 160 and may request the virtual token 160 to seal the encrypted object EObj using its supplemental public key 272. In response to the request, the virtual token 160 in an example embodiment performs a seal operation in the manner described above in regard to FIG. 4. For example, the virtual token 160 in response to the seal request may generate a sealed encrypted object SEObj that comprises the encrypted object EObj, a seal record SealRec, and a digest value DV that attests to the integrity of the encrypted object EObj and the seal record SealRec, and may provide the sealing component with the sealed encrypted object SEObj.

To obtain a sealed key Seal K, the sealing component in block 640 requests the physical token 150 to seal the key K to specified environment criteria using a specified key SK of the physical token 150. For example, the sealing component may specify the environment criteria by identifying one or more PCR registers 240, 242, 244 of the physical token 150 and may request the physical token 150 seal the key K using its supplemental public key 232. In an example embodiment, the sealing component specifies at least the monitor PCR register 240 that contains a metric of the virtual token 160 in order to prevent the key K from being released to an operating environment that does not include the correct virtual token 160. In response to the request, the physical token 150 in an example embodiment performs a seal operation in the manner described above in regard to FIG. 4. For example, the physical token 150 in response to the seal operation request may generate a sealed key SealK that comprises the key K, a seal record SealRec, and a digest value DV that attests to the integrity of the key K and the seal record SealRec, and may provide the sealing component with the sealed key SealK.

As a result of requesting the above seal operations, the sealing component obtains a multi-token sealed object MSObj that comprises two sealed portions: the sealed encrypted object SEObj and the sealed key SealK. The sealing component in block 650 may store the sealed portions of the multi-token sealed object MSObj. For example, the sealing component may store the sealed encrypted object SEObj and the sealed key SealK to a machine readable medium such as, for example, memory 130, a local hard drive of the I/O devices 170 or a remote network store via the network controller 140.

Figure 7:
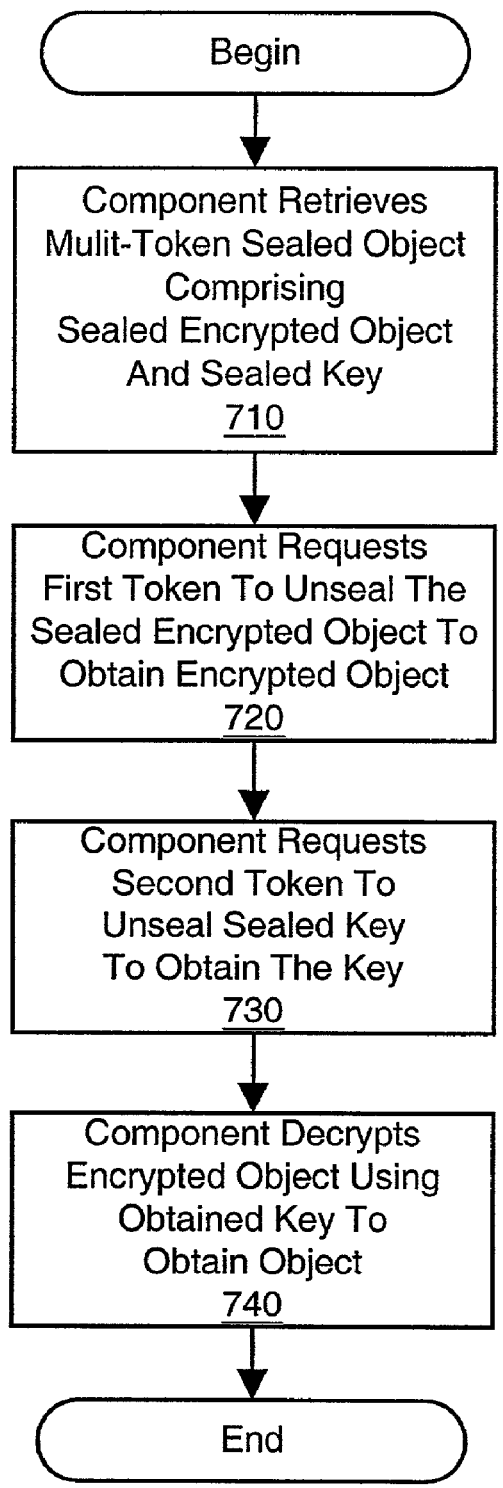
FIG. 7 illustrates an example multi-token unseal operation of the computing device of FIG. 1.

An example multi-token unseal operation is illustrated in FIG. 7. The multi-token unseal operation in general results in an unsealing component such as, for example, the monitor 310, the kernel 332, trusted applets 334, operating system 322, application 324, the physical token 150, and/or the virtual token 160 retrieving an object Obj that has been sealed to two or more tokens (e.g. physical token 150 and virtual token 160). The following example multi-token unseal operation is described in the context of a component unsealing an object Obj that has been sealed to the physical token 150 and the virtual token 160 of the example computing device 100. However, it should be appreciated that the unsealing component may alternatively unseal an object Obj that has been sealed to more than two tokens and that the unsealing component may unseal an object Obj that has been sealed to different combinations of tokens (e.g. two physical tokens).

In block 710, the unsealing component receives a sealed encrypted object SEObj and corresponding sealed key SealK. For example, the unsealing component may receive the sealed encrypted object SEObj and corresponding sealed key SealK in response to retrieving them from a machine readable medium such as, for example, memory 130, a local hard disk or a remote network store.

To obtain the encrypted object EObj, the unsealing component in block 720 provides the virtual token 160 with the sealed encrypted object SEObj and requests the virtual token 160 to unseal the sealed encrypted object SEObj. In response to the request, the virtual token 160 in an example embodiment performs an unseal operation in the manner described above in regard to FIG. 5. In particular, the virtual token 160 in an example embodiment provides the unsealing component with the encrypted object EObj only if the current device environment satisfies the environment criteria specified for the sealed encrypted object SEObj.

To obtain the key K, the unsealing component in block 730 provides the physical token 150 with the sealed key SealK and requests the physical token 150 to unseal the sealed key SealK. In response to the request, the physical token 150 in an example embodiment performs an unseal operation in the manner described above in regard to FIG. 5. In particular, the physical token 150 in an example embodiment provides the unsealing component with the key K only if the current device environment satisfies the environment criteria specified for the sealed key SealK.

The unsealing component in block 740 decrypts the encrypted object EObj using the key K and a symmetric cryptographic algorithm. As a result of decrypting the encrypted object, the unsealing component obtains the object Obj that was sealed to the physical token 150 and the virtual token 160.

The above example multi-token seal and unseal operations of FIGS. 6 and 7 use a single symmetric key K to encrypt the object Obj and decrypt the object Obj using a symmetric cryptographic algorithm. However, the multi-token seal and unseal operations may alternatively use a public key PubK to encrypt the object and a private key PrivK to decrypt the object Obj. For example, the token in block 610 may generate a private key PrivK and corresponding public key PubK and may provide the sealing component with the public key PubK. The sealing component in block 620 may encrypt the object Obj using the public key PubK. Further, the sealing component in block 640 may request the physical token 150 to seal the private key PrivK corresponding to the public key PubK, and the unsealing component may then later decrypt the encrypted object EObj using the private key PubK in block 740.

Further, a sealing component may seal the encrypted object EObj to more than two tokens. For example, the sealing component may divide the encrypted object EObj into two or more portions and may seal the portions to different virtual and/or physical tokens. The sealing component may similarly divide the key to decrypt the encrypted object EObj (e.g. the symmetric key K or the asymmetric private key PrivK) into two or more portions and seal the portions to different virtual and/or physical tokens. Alternatively, the sealing component may divide the object Obj into multiple objects Obj. The sealing object may then encrypt each Obj object with a different key K to obtain a set of encrypted objects EObj and may seal each encrypted object EObj and associated keys K to a different set of tokens.

Figure 8:
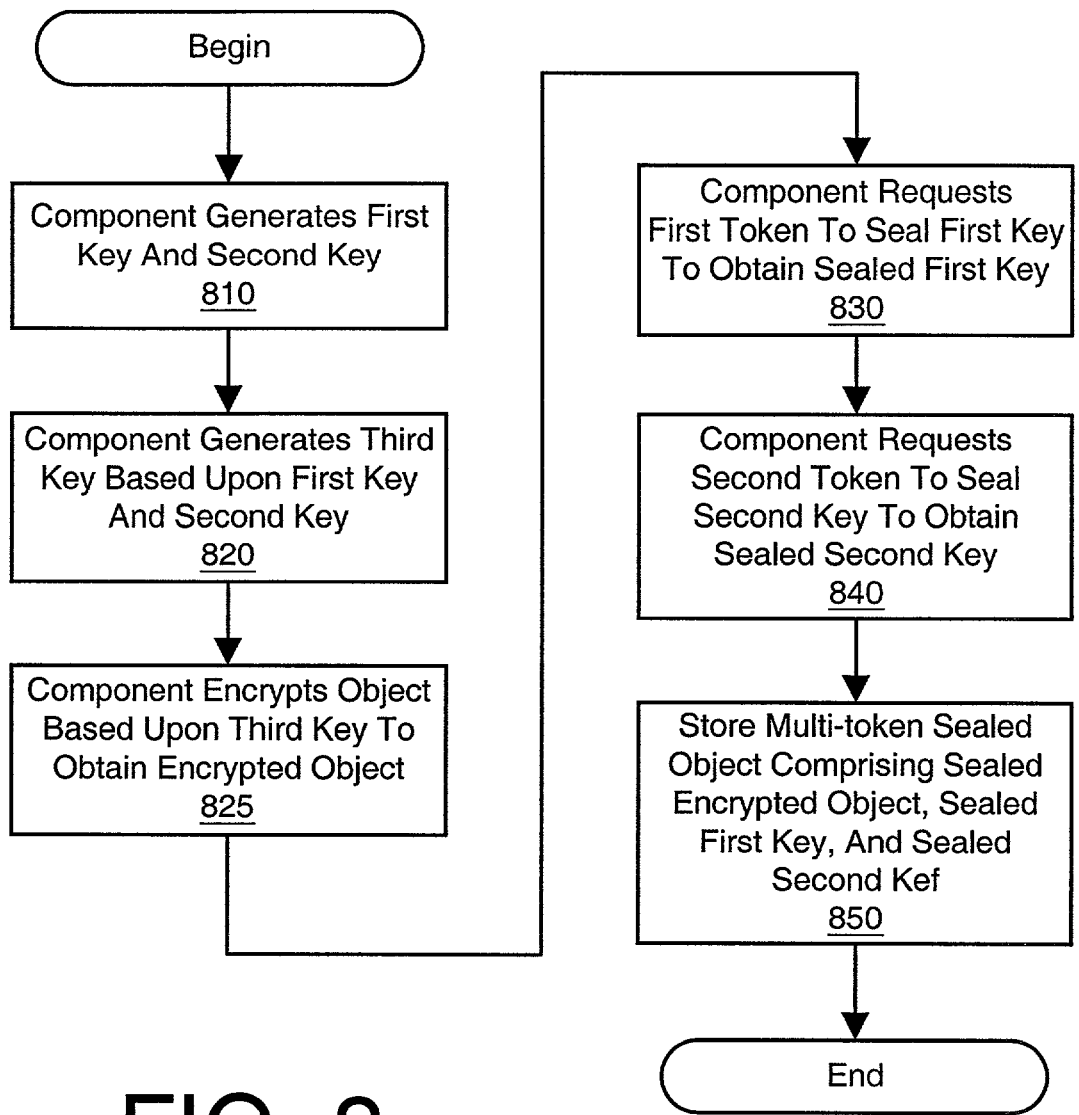
FIG. 8 illustrates another example multi-token seal operation of the computing device of FIG. 1.

Another example multi-token seal operation is illustrated in FIG. 8. The multi-token seal operation in general results in a sealing component such as, for example, the monitor 310, the kernel 332, trusted applets 334, operating system 322, application 324, the physical token 150, and/or the virtual token 160 generating a multi-token sealed object MSObj that is sealed to two or more tokens (e.g. physical token 150 and virtual token 160). The following example multi-token seal operation is described in the context of a sealing component sealing an object Obj to the physical token 150 and the virtual token 160 of the example computing device 100. However, it should be appreciated that the sealing component may alternatively seal the object Obj to more than two tokens and that the sealing component may seal the object Obj to different combinations of tokens (e.g. two physical tokens).

In block 810, a sealing component generates a first key K1 and a second key K2 using a random number generator such that keys K1 and K2 each comprises random uniqueness. The sealing component in block 820 generates a third key K3 based upon the first key K1, second key K2, and a key generation algorithm. For example, the sealing component may generate the third key K3 by performing a bitwise exclusive-OR (XOR) operation of the first key K1 and the second key K2. However, the sealing component may use other key generation algorithms to obtain the third key K3 from the keys K1, K2. The sealing component in block 825 encrypts the object Obj using the third key K3 and a symmetric cryptographic algorithm to obtain an encrypted object EObj.

To obtain a sealed first key SealK1, the sealing component in block 830 requests the virtual token 160 to seal the first key K1 to specified environment criteria using a specified key SK of the virtual token 160. For example, the sealing component may specify the environment criteria by identifying one or more PCR registers 280 of the virtual token 160 and may request the virtual token 160 seal the first key K1 using its supplemental public key 272. In response to the request, the virtual token 160 in an example embodiment performs a seal operation in the manner described above in regard to FIG. 4 and provides the sealing component with a sealed first key SealK1 that comprises the first key K1, a seal record SealRec, and a digest value DV that attests to the integrity of the first key K1 and the seal record SealRec.

To obtain a sealed second key SeaiK2, the sealing component in block 840 requests the physical token 150 to seal the second key K2 to specified environment criteria using a specified key SK of the physical token 150. For example, the sealing component may specify the environment criteria by identifying one or more PCR registers 240, 242, 244 of the physical token 150 and may request the physical token 150 seal the second key K2 using its supplemental public key 232. In an example embodiment, the sealing component specifies at least the monitor PCR register 240 that contains a metric of the virtual token 160 in order to prevent the key K from being released to an operating environment that does not include the correct virtual token 160. In response to the request, the physical token 150 in an example embodiment performs a seal operation in the manner described above in regard to FIG. 4 to obtain a sealed second key SealK2. The physical token 150 further provides the encryption object with the sealed second key SealK2 that comprises the second key K2, a seal record SealRec, and a digest value DV that attests to the integrity of the key K and the seal record SealRec.

The sealing component now has a multi-token sealed object MSObj that comprises three sealed portions: the encrypted object EObj, the sealed first key SealK1, and the sealed second key SealK2. The sealing component in block 850 may store the sealed portions of the multi-token sealed object MSObj. For example, the sealing component may store the encrypted object EObj, the sealed first key SealK1, and the sealed second key SealK2 to a machine readable medium such as, for example, memory 130, a local hard drive of the I/O devices 170 or a remote network store via the network controller 140.

Figure 9:
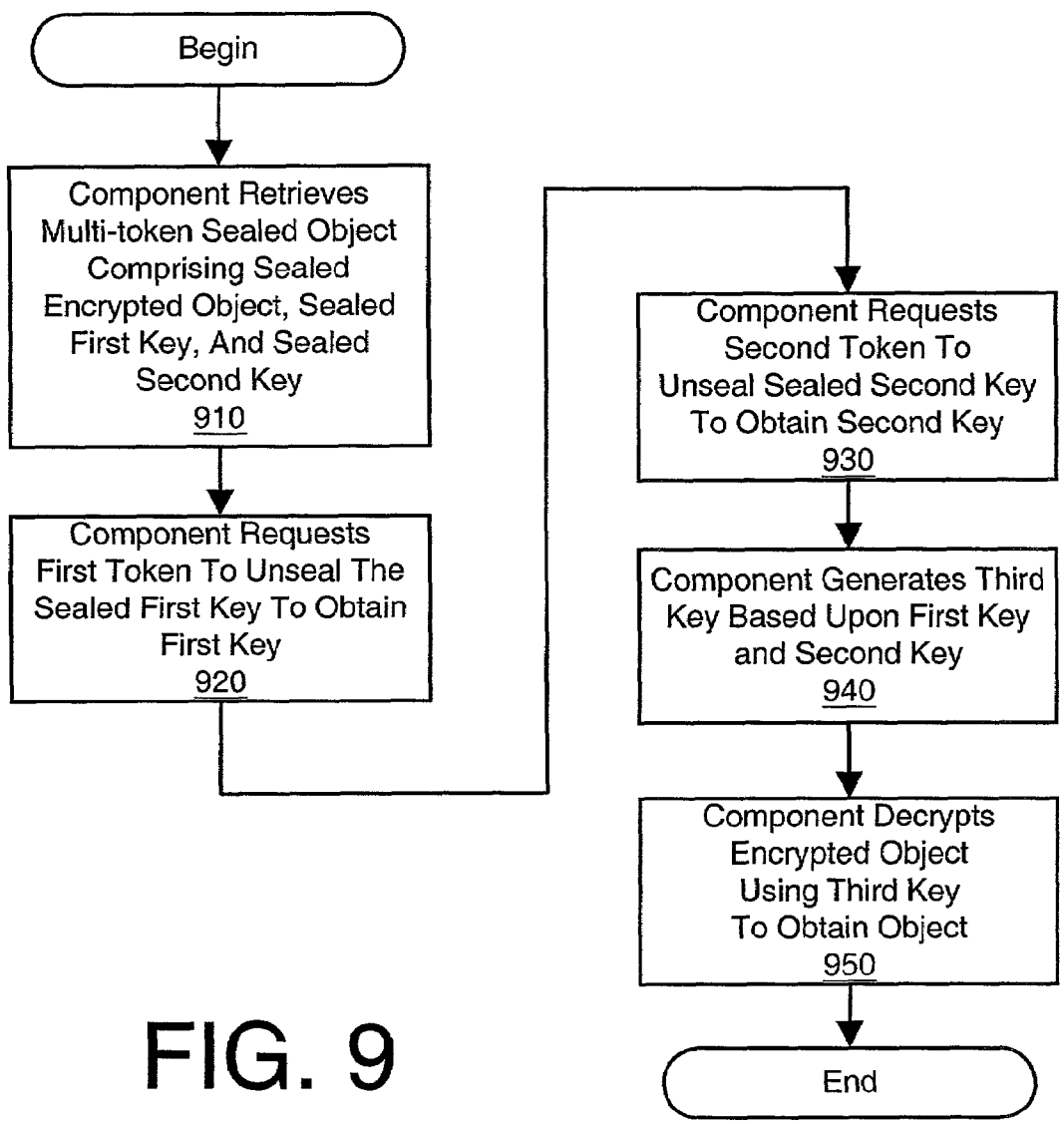
FIG. 9 illustrates another example multi-token unseal operation of the computing device of FIG. 1.

An example multi-token unseal operation is illustrated in FIG. 9. The multi-token unseal operation in general results in an unsealing component such as, for example, the monitor 310, the kernel 332, trusted applets 334, operating system 322, application 324, the physical token 150, and/or the virtual token 160 retrieving an object Obj that has been sealed to two or more tokens (e.g. physical token 150 and virtual token 160). The following example multi-token unseal operation is described in the context of an unsealing component unsealing an object Obj that has been sealed to the physical token 150 and the virtual token 160 of the example computing device 100. However, it should be appreciated that the unsealing component may alternatively unseal an object Obj that has been sealed to more than two tokens and that the unsealing component may unseal an object Obj that has been sealed to different combinations of tokens (e.g. two physical tokens).

In block 910, the unsealing component receives a multi-token sealed object MSObj that includes an encrypted object EObj, a first sealed key SealK1, and a second sealed key SealK2. For example, the unsealing component may receive the encrypted object EObj and sealed keys SealK1, SealK2 in response to retrieving them from a machine readable medium such as, for example, memory 130, a local hard disk or a remote network store.

In block 920, the unsealing component provides the virtual token 160 with the sealed first key SealK1 and requests the virtual token 160 to unseal the sealed first key SealK1. In response to the request, the virtual token 160 in an example embodiment performs an unseal operation in the manner described above in regard to FIG. 5. In particular, the virtual token 160 in an example embodiment provides the unsealing component with the first key K1 only if the current device environment satisfies the environment criteria specified for the sealed first key SealK1.

The unsealing component in block 930 provides the physical token 150 with the sealed second key SealK2 and requests the physical token 150 to unseal the sealed second key SealK2. In response to the request, the physical token 150 in an example embodiment performs an unseal operation in the manner described above in regard to FIG. 5. In particular, the physical token 150 in an example embodiment provides the unsealing component with the second key K2 only if the current device environment satisfies the environment criteria specified for the sealed second key SealK2.

In block 940, the unsealing component generates a third key K3 based upon the first key K1, second key K2, and a key generation algorithm. For example, the unsealing component may generate the third key K3 by performing a bitwise exclusive-OR (XOR) operation of the first key K1 and the second key K2. However, the unsealing component may use other key generation algorithms to obtain the third key K3 from the keys K1, K2.

The unsealing component in block 950 decrypts the encrypted object EObj using the third key K3 and a symmetric cryptographic algorithm. As a result of decrypting the encrypted object EObj, the unsealing component obtains the object Obj that was sealed to the physical token 150 and the virtual token 160.

The above multi-token seal and unseal operations of FIGS. 8 and 9 are described in the context of sealing an object Obj to two tokens. However, the sealing component may alternatively seal the object to more than two tokens. For example, the sealing component in block 810 may generate three of more keys and may generate an encryption key in block 820 from the generated keys. The sealing component in block 825 may encrypt the object with the encryption key generated in block 820. The sealing component may further seal the keys used to generate the encryption key to various tokens of the computing device 100.

The computing device 100 may perform all or a subset of the seal/unseal operations (FIGS. 4 and 5) and/or multi-token seal/unseal operations (FIGS. 6-9) in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while FIGS. 4-9 are illustrated as a sequence of operations, the computing device 100 perform various illustrated operations of the seal/unseal operations (FIGS. 4 and 5) and/or multi-token seal/unseal operations (FIGS. 6-9) in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   requesting a first token to unseal a sealed first portion of a multi-token sealed object to obtain a first portion of the multi-token sealed object,
   receiving the first portion in response to the first token unsealing the sealed first portion only if the first token determines that a current device environment satisfies environment criteria specified for the sealed first portion,
   requesting a second token to unseal a sealed second portion of a multi-token sealed object to obtain a second portion of the multi-token sealed object, and
   using the first portion and the second portion to obtain an object from the multi-token sealed object.

2. The method of claim 1 further comprising obtaining the object of the multi-token sealed object by using the first portion as a key to decrypt the second portion.

3. The method of claim 1 further comprising
   receiving a key in response to the first token unseating the sealed first portion,
   receiving an encrypted object in response to the second token unsealing the second portion, and
   obtaining the object of the multi-token sealed object by using the key to decrypt the encrypted object.

4. The method of claim 1 further comprising
   generating a key based upon the first portion and the second portion of the multi-token sealed object, and
   obtaining the object of the multi-token sealed object by using the generated key to decrypt an encrypted object of the multi-token sealed object.

5. The method of claim 1 further comprising
generating a key from the first portion and the second portion of the multi-token sealed object, and
obtaining the object of the multi-token sealed object by using the generated key and an asymmetric cryptographic algorithm to decrypt an encrypted object of the multi-token sealed object.

6. The method of claim 1 further comprising
receiving a first key in response to the first token unsealing the sealed first portion,
receiving a second key in response to the second token unsealing the second portion,
generating a third key from the first key and the second key, and
obtaining the object of the multi-token sealed by using the third key to decrypt an encrypted object of the multi-token sealed object.

7. The method of claim 1 further comprising
receiving a first key in response to the first token unsealing the sealed first portion only if the first token determines that a current device environment satisfies environment criteria specified for the sealed first portion,
receiving a second key in response to the second token unsealing the second portion only if the second token determines that the current device environment satisfies environment criteria specified for the sealed second portion,
generating a third key from the first key and the second key, and
obtaining the object of the multi-token sealed by using the third key to decrypt an encrypted object of the multi-token sealed object.

8. The method of claim 7 further comprising
receiving the first key in response to the first token unsealing the sealed first portion only if a first value computed from the first portion and a first seal record of the sealed first portion has a predetermined relationship with a first digest value of the sealed first portion, and
receiving the second key in response to the second token unsealing the sealed second portion only if a second value computed from the second portion and a second seal record of the sealed second portion has a predetermined relationship with a second digest value of the sealed second portion.

9. The method of claim 1 further comprising
receiving a first key in response to the first token unsealing the sealed first portion only if the first token generated the sealed first portion,
receiving a second key in response to the second token unsealing the second portion only if the second token generated the sealed second portion,
generating a third key from the first key and the second key, and
obtaining the object of the multi-token sealed by using the third key to decrypt an encrypted object of the multi-token sealed object.

10. A method comprising
requesting a plurality of tokens to unseal a plurality sealed portions of a multi-token sealed object,
receiving a plurality of unsealed portions of the multi-token sealed object only if a current device environment satisfies device criteria specified for the plurality of sealed portions, and
obtaining an object that has been sealed to the plurality of tokens using the plurality of unsealed portions of the multi-token sealed object.

11. The method of claim 10 wherein obtaining comprises
generating a key from the plurality of unsealed portions of the multi-token sealed object, and
decrypting an encrypted object using the key to obtain the object.

12. The method of claim 10 wherein obtaining comprises
generating a key from the plurality of unsealed portions of the multi-token sealed object, and
decrypting an encrypted object using the key and a symmetric cryptographic algorithm to obtain the object.

13. The method of claim 12 further comprising unsealing the plurality of sealed portions only if the plurality of tokens generated the plurality of sealed portions.

14. A method comprising
requesting a first token of a computing device to seal a first portion of a multi-token sealed object to first environment criteria, and
requesting a second token of a computing device to seal a second portion of the multi-token sealed object to second environment criteria.

15. The method of claim 14 further comprising
encrypting an object using a symmetric cryptographic algorithm and a key to obtain an encrypted object, and
receiving a sealed encrypted object in response to the first token sealing the first portion that comprises the encrypted object,
receiving a sealed key in response to the second token sealing the second portion that comprises the key.

16. The method of claim 14 further comprising
encrypting the object using an asymmetric cryptographic algorithm and an encryption key of an asymmetric key pair to obtain an encrypted object,
receiving a sealed encrypted object in response to the first token sealing the first portion that comprises the encrypted object,
receiving a sealed decryption key in response to the second token sealing the second portion that comprises a decryption key of the asymmetric key pair.

17. The method of claim 14 further comprising
receiving a sealed first portion encrypted by the first token using a first key of the first token, the sealed first portion comprising the first key, a first seal record comprising one or more metrics specified by the first environment criteria, and a first digest value that attests to the integrity of the first key and the first seal record, and
receiving a sealed second portion encrypted by the second token using a second key of the second token, the sealed second portion comprising the second key, a second seal record comprising one or more metrics specified by the second environment criteria, and a second digest value that attests to the integrity of the second key and the second seal record.

18. The method of claim 17 wherein
the first seal record comprises a unique first identifier for the first token, and
the second seal record comprises a unique second identifier for the second token.

19. The method of claim 14 further comprising
encrypting the object using key that was generated based upon a first key and a second key,
receiving a sealed first key in response to the first token sealing the first portion that comprises the first key,
receiving a scaled second key in response to the second token sealing the second portion that comprises the second key.

20. The method of claim 19 further comprising
generating a sealed first portion by encrypting the first portion and metrics specified by the first environment criteria using a first key of the first token, and
generating a sealed second portion by encrypting the second portion and metrics specified by the second environment criteria using a second key of the second token.

21. The method of claim 20 wherein
the first token comprises a virtual token, and
the second token comprises a physical token.

22. The method of claim 21 further comprising
specifying the second environment criteria by identifying at least one configuration register of the physical token that comprises a metric of the virtual token.

23. The method of claim 14 further comprising
specifying the first environment criteria by identifying one or more configuration registers of the first token that record metrics of the computing device, and
specifying the second environment criteria by identifying one or more configuration registers of the second token that record metrics of the computing device.

24. The method of claim 23 wherein
specifying the second environment criteria comprises identifying at least one configuration register of the second token that comprises a metric of the first token.

25. The method of claim 24 wherein
the first token comprises a virtual token, and
the second token comprises a physical token.

26. A device comprising
a virtual token comprising one or more configuration registers that record metrics of a device environment and one or more processing units to generate a sealed first key that comprises a first key sealed to first environment criteria,
a physical token comprising one or more configuration registers that record metrics of the device environment, and one or more processing units to generate a sealed second key that comprises a second key sealed to second environment criteria, and
a sealing component to generate a third key based upon the first key and the second key, encrypt an object using the third key to obtain an encrypted object, request the virtual token to seal the first key to obtain the sealed first key, and request the physical token to seal the second key to obtain the sealed second key.

27. The device of claim 26 wherein the sealing component specifies the first environment criteria by identifying one or more configuration registers of the virtual token to which to seal the first key, and specifies the second environment criteria by identifying one or more configuration registers of the physical token to which to seal the second key.

28. The device of claim 27 wherein the sealing component specifies a first public key of the virtual token with which to seal the first key, and specifies a second public key of the physical token with which to seal the second key.

29. The device of claim 28 wherein
the virtual token generates the sealed first key by using the first public key to encrypt the first key, a first seal record comprising metrics specified by the first environment criteria, and a first digest value that attests to the integrity of the first key and the first seal record, and
the physical token generates the sealed second key by using the second public key to encrypt the second key, a second seal record comprising metrics specified by the second environment criteria, and a second digest value that attests to the integrity of the second key and the second seal record.

30. The device of claim 26 further comprising an unsealing component to request the virtual token to unseal the sealed first key to obtain the first key, to request the physical token to unseal the sealed second key to obtain the second key, to generate a third key based upon the first key and the second key, and to decrypt the encrypted object using the third key.

31. The device of claim 30 wherein
the processing units of the virtual token further unseal the sealed first key and provide the unsealing component with the first key only if the metrics of the one or more configuration registers of the virtual token satisfy the first environment criteria, and
the processing units of the physical token further unseal the sealed key and provide the unsealing with the key used to decrypt the encrypted object only if the metrics of the one or more configuration registers of the physical token satisfy the second environment criteria.

32. The device of claim 31 wherein
the virtual token unseals the sealed object by decrypting the sealed object using a first private key of the virtual token to obtain the encrypted object, a first seal record, and a first digest value that attests to the integrity of the encrypted object and the first seal record, and
the physical token unseals the sealed key by decrypting the sealed key using a second private key of the physical token to obtain the key, a second seal record, and a second digest value that attests to the integrity of the key and the second seal record.

33. The device of claim 30 wherein
the processing units of the virtual token provide the unsealing component with the encrypted object only if the first digest value obtained from the sealed first key has a predetermined relationship with a value computed from the first key and the first seal record of the sealed first key, and
the processing units of the physical token provide the unsealing component with the second key only if the second digest value obtained from the sealed second key has a predetermined relationship with a value computed from the second key and the second seal record of the sealed second key.

34. A machine readable medium comprising a plurality of instructions that, in response to being executed, result in a computing device
sealing a first portion of a multi-token sealed object to first environment criteria using a first public key of a first token to obtain a sealed first portion, and
sealing a second portion of the multi-token sealed object to second environment criteria using a second public key of a second token to obtain a sealed second portion.

35. The machine readable medium of claim 34 wherein the plurality of instructions further result in the computing device
specifying the first environment criteria by identifying one or more configuration registers of the first token that record metrics of the computing device, and
specifying the second environment criteria by identifying one or more configuration registers of the second token that record metrics of the computing device.

36. The machine readable medium of claim 35 wherein the plurality of instructions further result in the computing device
generating the sealed first portion such that the sealed first portion comprises the first portion, a first seal record comprising the metrics of the one or more configuration registers specified by the first environment criteria, and a first digest value of the encrypted object and the seal record, and generating the sealed second portion such that the sealed second portion comprises the second portion, a second seal record comprising the metrics of the one or more configuration registers specified by the second environment criteria, and a second digest value of the key and the second seal record.

37. The machine readable medium of claim 36 wherein the plurality of instructions further result in the computing device
unsealing the sealed first portion using a first private key of the first token and providing the first portion only if the metrics recorded by the first token have a predetermined relationship with the metrics of the first seal record, and
unsealing the sealed second portion using a second private key of the second token and providing the second portion only if the metrics recorded by the second token have a predetermined relationship with the metrics of the second seal record.

38. The machine readable medium of claim 37 wherein the plurality of instructions further result in the computing device
providing the first portion only if the first digest value obtained from the sealed encrypted object has a predetermined relationship to a first value computed from the encrypted object and the first seal record, and
providing the second portion only if the second digest value obtained from the sealed key has a predetermined relationship to a second value computed from the key and the second seal record.

39. The machine readable medium of claim 34 wherein the plurality of instructions further result in the computing device
unsealing the sealed first portion using a first private key of the first token and providing the first portion object only if a current device environment satisfies the first environment criteria, and
unsealing the sealed second portion using a second private key of the second token and providing the second portion only if the current device environment satisfies the second environment criteria.

40. A device comprising
a chipset,
a processor coupled to the chipset,
memory coupled to the chipset, the memory comprising a plurality of instructions that, when executed by the processor, result in the processor implementing a virtual token that records metrics of a device environment, that receives a first key used to generate a decryption key, and that seals the first key to one or more metrics recorded by the virtual token in response to receiving a seal operation request, and
a physical token coupled to the chipset, the physical token to record metrics of the device environment, to receive a second key used to generate the decryption key, and to seal the second key to one or more metrics recorded by the physical token in response to receiving a seal operation request.

41. The device of claim 40 wherein the one or more metrics recorded by the physical token comprises a virtual token metric and the physical token seals the key to at least the virtual token metric.

42. The device of claim 40 wherein the one or more metrics recorded by the physical token comprises a metric of the plurality of instructions that result in the processor implementing the virtual token and the physical token seals the key to at least the metric of the plurality of instructions.

43. The device of claim 40 wherein
the plurality of instructions, in response to execution, result in the processor generating a scaled first key that comprises the first key and a unique first identifier for the virtual token, and
the physical token generates a sealed second key that comprises the second key and a unique second identifier for the physical token.

* * * * *